United States Patent [19]

Huisman et al.

[11] 4,425,409

[45] Jan. 10, 1984

[54] METHOD OF PREPARING A MAGNETIC PIGMENT OF $\gamma$-FE$_2$O$_3$ PARTICLES AND RECORDING ELEMENT

[75] Inventors: Hendrikus F. Huisman; Harm J. Groen, both of Oosterhout, Netherlands

[73] Assignee: U.S. Philips Corporation, New York, N.Y.

[21] Appl. No.: 118,258

[22] Filed: Feb. 4, 1980

[30] Foreign Application Priority Data

Feb. 23, 1979 [NL] Netherlands ............................ 7901437

[51] Int. Cl.$^3$ ............................................. H01F 10/02
[52] U.S. Cl. ............................... 428/457; 252/62.54; 423/634; 428/694; 428/900
[58] Field of Search ................ 423/634; 427/127–132, 427/48; 428/900, 694; 252/62.54

[56] References Cited

U.S. PATENT DOCUMENTS 4,054,643  10/1977  Desmond ............................ 423/634

OTHER PUBLICATIONS

"Purification of Iron Oxide [Fe$_2$O$_3$]", Mitani et al, Chemical Abstracts, vol. 82, p. 615 (1975), Abstract No. 148826n.

*Primary Examiner*—Bernard D. Pianalto
*Attorney, Agent, or Firm*—Marc D. Schechter

[57] ABSTRACT

A method of manufacturing a magnetic pigment of $\gamma$-Fe$_2$O$_3$ particles in which the process starts with an alkaline or acid reacting aqueous dispersion of $\gamma$-Fe$_2$O$_3$. According to the invention, a water-soluble ammonium salt, which is derived from a low molecular weight, weakly acidic organic acid, is added to the aqueous dispersion, the $\gamma$-Fe$_2$O$_3$ particles flocculating. The flocculated $\gamma$-Fe$_2$O$_3$ is separated, washed with water which preferably also comprises such a water-soluable ammonium salt, and is then dried. The ammonium salt volatilizes in the drying process used either as such or after decomposition. A suitable ammonium salt is ammonium acetate. The pigment obtained according to the invention has a low content of salt absorbed at the surfaces of the pigment particles, for example, a content lower than 0.1 and, for example 0.03% by weight. A magnetic recording element which is based on the pigment obtained according to the invention shows an improved life time in particular upon storage or during use in moist environments.

11 Claims, No Drawings

METHOD OF PREPARING A MAGNETIC PIGMENT OF $\gamma$-$FE_2O_3$ PARTICLES AND RECORDING ELEMENT

BACKGROUND OF THE INVENTION

The invention relates to a method of preparing a magnetic pigment of $\gamma$-$Fe_2O_3$ particles which may be doped with metals, in which method the particles are separated from an aqueous dispersion, washed with water and dried.

The term $\gamma$-$Fe_2O_3$ particles is to be understood to hereinafter also include $\gamma$-$Fe_2O_3$ particles which may be doped with metals such as Co, Ni, Zn, Sn and Ti.

The above method is universally used in the manufacture of magnetic pigments and it is described, inter alia, in German Offenlegungsschrift No. 2,054,254.

The pigments thus manufactured and commercially available are used in magnetic recording elements, in particular magnetic tapes.

A magnetic recording element comprises a carrier in the form of a tape or disk usually manufactured from a synthetic resin, for example polyester or polyvinyl chloride, and a magnetic coating provided thereon which comprises a binder in. The magnetic coating the magnetic pigment is finely distributed by using a dispersion agent. The binder is a polymeric substance, for example, polyvinyl chloride, polyvinyl acetate, polyester, polyester amide, polyacrylate, polyurethane or copolymers of at least two monomers which are selected, for example, from vinyl chloride, vinyl acetate, acrylonitrile, vinyl alcohol, vinyl butyral and vinylidene chloride.

Suitable dispersion agents are, for example, lecithine, mono- or diesters of phosphoric acid and alcohols which, if desired, are ethoxylated, or alkyl aryl sulphonic acids.

Other auxiliary substances which may be incorporated in the magnetic coating are, for example, antistatic agents, such as soot, and lubricants, such as fatty acid, fatty acids derivatives, silicone oils, vaselin, paraffin or graphite.

A recording element is manufactured, for example, by thoroughly mixing and grinding the ingredients for the magnetic coating together with an organic solvent in a ballmill for several hours and providing the resulting dispersion, after the coarser particles have been sieved out, on the carrier in a uniform layer. Examples of useful organic solvents are esters such as ethyl acetate, ethers such as tetrahydrofuran, ketones such as methyl ethyl ketone and methyl isobutyl ketone or chlorinated hydrocarbons such as 1,2-dichloroethane.

Magnetic recording elements, such as magnetic tapes comprising the usual pigments of $\gamma$-$Fe_2O_3$ particles manufactured while using the above-mentioned method, exhibit a reduction in magneto-acoustical properties over a long period of time, in particular when stored or used in moist circumstances.

The strength and accuracy of a signal provided on the recording element, for example a sound or video signal, are reduced and show undesired variations over a long period of time.

In our opinion, this reduction in quality is due to a gradual deposition of salts on the surface of the magnetic coating. It is believed that the salts originate from the surfaces of the $\gamma$-$Fe_2O_3$ particles dispersed in the magnetic coating. Initially, the salts are bonded electrostatically to the surfaces of the $\gamma$-$Fe_2O_3$ particles. In a moist environment, water may be condensed in the micropores in the magnetic coating thereby reducing the electrostatic bond between salts and $\gamma$-$Fe_2O_3$ particles so that the salts dissolve in the condensed water. As a result of physical transport phenomena in the pores, the salts are conveyed to the surface of the magnetic coating and crystallize there due to evaporation of the water. Salts of the slightly heavier metals or alkali metals, such as iron sulphate, zinc sulphate, calcium sulphate and calcium chloride, are throught to be of particular concern.

The extent of salt formation and the rate of salt formation also depend on the composition of the magnetic coating. If, for example, the magnetic coating comprises a silicone oil as a lubricant, the usually hydrophilic character of the binder will be masked due to the apolar character of the oil so that the condensation of moisture in the pores of the magnetic coating is retarded. Of course, the porosity of the magnetic coating also influences the extent of salt formation. For example, the salt formation when using a polyurethane binder is significantly less, due to lower porosity, then when using vinyl chloride—vinyl acetate copolymer as a binder.

Although in a wet environment salt formation can be suppressed and retarded by suitable choices of binder and apolar auxiliary substances, the risk of salt formation over a long period of time cannot be eliminated.

The method of manufacturing a magnetic pigment, as described above, begins with an aqueous dispersion of $\gamma$-$Fe_2O_3$ particles. Such a dispersion can be obtained in a usual manner from elemental iron or from an inorganic iron salt, such as ferrous sulphate and ferrous chloride. Depending on the mode of preparation chosen, the aqueous dispersion is either acidic or alkaline.

A suitable method of preparing the dispersion is the so-called Gamras process. In this process an aqueous sulphuric acid solution of ferrous sulphate obtained by dissolving elemental iron in sulphuric acid, is made alkaline by the addition of, for example, a sodium hydroxide solution. Crystal seeds of $\alpha$-FeOOH (goethite) are formed in the solution. The seed solution is acidified by the addition of sulphuric acid and iron and goethite crystals are grown on the seeds in the resulting acid medium. The goethite is separated with water and dried, if desired, at elevated temperature. By reduction with hydrogen at a temperature of roughly 300°–400° C., the goethite is converted into magnetite ($Fe_3O_4$). The magnetic is then converted into the magnetic $\gamma$-$Fe_2O_3$ pigment by oxidation with air at an elevated temperature of approximately 250° C. The pigment has an acidic character having a pH value which generally varies from 2 to 5. A pigment of $\gamma$-$Fe_2O_3$ doped with metals is obtained by the addition of salts of the desired metals, such as cobalt sulphate or zinc sulphate, to the sulphuric acid reaction medium or to the goethite crystals.

An alkaline reacting pigment of $\gamma$-$Fe_2O_3$ particles can be obtained according to the so-called alkaline process. For this purpose, as in the Gamras process, a sulphuric acid solution of ferrous sulphate is made alkaline by the addition of notably a sodium hydroxide solution. Goethite seeds are formed. The alkalinity of the seed solution is reduced by the addition of sulphuric acid and extra ferrous sulphate solution. However, the reaction medium remains alkaline and goethite crystal growth is produced in the medium. The resulting alkaline reacting goethite is converted in the same manner as in the Gamras process into a γ-Fe$_2$O$_3$ pigment which has an alkaline character with a pH value of approximately 8-9.

The γ-Fe$_2$O$_3$ pigment is dispersed in water, separated from the aqueous dispersion by filtration or decantation, washed with water and dried at a temperature of at most 150°-200° C.

According to the above-mentioned German Offenlegungsschrift No. 2,054,254, the filtered γ-Fe$_2$O$_3$ pigment is washed with warm water for a long period of time. It appears from the examples that washing was carried out with water at 90°-100° C. for 5 hours. Of course, such a washing process is very costly. In addition such a process does not lead to optimum results because the washed and dried pigment has too much salt bonded electrostatically to the surfaces of the particles so that upon processing the pigment in recording elements, salt deposits are produced.

A further disadvantage of the known method is that the separation of the γ-Fe$_2$O$_3$ particles from the aqueous dispersion is a time consuming and cumbersome process.

The dispersion is a largely colloidal solution which upon filtration initially passes through the filter. During filtration, a filter cake of coarser particles is gradually formed which filters out the smaller colloidal particles. Actually one then has a silted-up filter. Filtration occurs slowly and quite some material is lost before the filter cake is built up.

By the addition of a net-shaped polymeric binder, for example, polyacrylamide, a flocculation of the particles to be separated can be produced and thus a smoothly running filtration process can be realized. It has been found, however, that the flocculent does not disappear entirely from the pigment, nor upon heating as carried out in the drying process. Organic residues, such as carbon residues originating from the flocculent, remain in the final product. Such contaminations have a significant quality-reducing effect on the properties of the magnetic γ-Fe$_2$O$_3$ pigment.

SUMMARY OF THE INVENTION

The invention provides a method of the type described above which does not exhibit the above-mentioned disadvantages. According to the present invention, a water-soluble ammonium salt is added to the aqueous dispersion. The ammonium salt is derived from a low molecular weight, weakly acidic organic acid. In the drying process used, the ammonium salt volatilizes as such or after decomposition.

"Low molecular weight" is to be understood to mean a molecular weight of at most 150.

By the addition of the water-soluble ammonium salt to the aqueous dispersion of the γ-Fe$_2$O$_3$ particles, the particles easily flocculate and can be separated from the dispersion in a simple manner without loss by filtration or, if desired for example, by decanting. Furthermore, the salts present at the surfaces of the particles are replaced by the ammonium salt which is present in a comparatively large quantity and which volatilizes during the drying process used either as such or after decomposition. A pure γ-Fe$_2$O$_3$ pigment is obtained containing at most only very few absorbed salts. Experiments have demonstrated that the salt content of the pigment is less than 0.1% by weight, for example, 0.03% by weight.

If the process is started from an acid-reacting dispersion of γ-Fe$_2$O$_3$ particles, preferably a water-soluble base is also added to the dispersion in addition to the ammonium salt.

For this this purpose alkali metal hydroxides, for example NaOH or KOH, may be used. The use of NH$_3$ is to be preferred. The quantity of added base is not restricted to narrow limits. Preferably a quantity is added so that the pH of the dispersion without ammonium salt is from 6 to 9.

It is believed, that the favorable results obtained by means of the method according to the invention are related at least partly to the Applicants' theory that the γ-Fe$_2$O$_3$ particles approach or reach the isoelectric point by the addition of the ammonium salt, or the ammonium salt and the base, to the aqueous dispersion. As a result of this the electrostatic bond to the salts present at the surfaces of the particles will be considerably reduced so that an exchange with the ammonium salt may take place. In this connection it is to be noted that in the starting dispersion the γ-Fe$_2$O$_3$ particles show a clear electric charge, namely a positive charge in the case of an acid-reacting dispersion and a negative charge in the case of an alkaline-reacting dispersion. Comparatively strongly bonded skins of ions originating from the salts will be formed around the particles, the particles also obtaining a clearly colloidal character. It is believed that by the measure according to the invention this particle structure is broken.

In a further preferred form of the method of the invention an ammonium salt, as described above is also added to the washing water. Due to this measure the other salts which are possibly present at the surfaces of the particles are replaced by the ammonium salt. It is believed that in this washing process the particles are also near the isoelectric point so that there can be an effective exchange between the remaining other salts and the ammonium salt. Furthermore, by adding ammonium salt to the wash water, normal washing water, i.e. non-deionized washing water at normal ambient temperature, may be used.

The quantity of ammonium salt used is not restricted to narrow limits. Good results are achieved when 1-2 g of ammonium salt per 100 g of pigment are used.

Examples of useful ammonium salts are trimethyl ammonium acetate and triethanol ammonium acetate.

A very suitable ammonium salt is an ammonium acetate, ammonium oxalate, ammonium carbonate or mixtures thereof. In particular the use of ammonium acetate leads to excellent results.

The invention also relates to a magnetic recording element which comprises a carrier and a magnetic coating provided thereon. The coating comprises a binder and a pigment of γ-Fe$_2$O$_3$ particles which is finely dispersed therein by using a dispersion agent. The particles may be doped with metals. According to the invention, the particles contain substantially no salts bonded electrostatically to the surfaces of the particles, the particles having been obtained by using the method described above.

The manufacture of the recording element according to the invention may be carried out in the same manner described above. Suitable binders, dispersion agents and auxiliary substances, if any, such as antistatic agents and lubricants, may be added to the pigment such that the quantity of pigment in the magnetic coating is approximately 60-80% by weight, calculated based on the overall weight of the magnetic coating. The quantity of dispersion agent is approximately 0.5-6% by weight, calculated based on the quantity of pigment. The auxiliary substances, for example lubricant, are used in quantities of approximately 0.1–10% by weight, calculated based on the quantity of binder.

The recording element of the invention has the above-mentioned advantage of an excellent lifetime in moist environments, even when using strongly hydrophilic binders. In particular excellent results are obtained with a vinyl chloride-vinyl acetate copolymer binder, in which a comparatively large amount of moisture condensation takes place, as well as when using a comparatively high content of approximately 70–80% by weight of pigment, in which the porosity of the magnetic coating occurs.

DESCRIPTION OF THE PREFERRED EMBODIMENTS

The invention will be described in greater detail by means of the following specific examples.

EXAMPLE 1

5 g of ammonium acetate were added, while stirring, to 1 l of an aqueous dispersion containing 250 g of a pigment of $\gamma$-$Fe_2O_3$ particles manufactured according to the alkaline process and having a pH value of 8.0. The acidity increased to a value of 6.9. The dispersion was stirred for another 30 minutes, the pigment flocculating substantially immediately. The pigment was filtered through a 10 $\mu$m filter without loss of material and washed on the filter twice with 1 liter of non-deionized water having a hardness of 7. 2 g of ammonium acetate had been added to the washing water. The temperature of the washing water was 20° C. After the washing process the pigment was removed from the filter and dried in air at a temperature of 140° C.

According to the prior method, for comparison, a pigment of $\gamma$-$Fe_2O_3$ particles was manufactured by filtering 1 l of the above aqueous dispersion (containing 250 g of pigment and having a pH of 8) through a 10 $\mu$m filter. The filtration was extremely cumbersome and gave a significant loss of material. The pigment was washed on the filter twice with 1 l of deionized water of at 90° C. The pigment was removed from the filter and dried in air at 140° C.

Both the pigment manufactured according to the invention and the comparison pigment were processed as follows to produce a magnetic tape.

The following ingredients were introduced into a glass bead mill having glass beads of 1 mm diameter.
98.5 parts by weight of pigment
3.0 parts by weight of phosphoric acid ester (trade name Gafac RM 710)
1.2 parts by weight of $Al_2O_3$
150 parts by weight of 20% solution of vinyl chloride vinyl acetate copolymer in a mixture of 15 parts by volume of methyl ethyl ketone, 35 parts by volume of methyl isobutyl ketone and 50 parts by volume of toluene
100 parts by weight of a mixture of 15 parts by volume of methyl ethyl ketone, 35 parts by volume of methyl isobutyl ketone and 50 parts by volume of toluene The mixture of ingredients was stirred and ground for two hours, decanted from the bead mill, filtered through a cellulose asbestos filter and uniformly provided on a carrier tape of polyester. The assembly of carrier and coating was dried and calendered, a coating thickness of 6$\mu$ being obtained.

The magnetic tape thus manufactured was provided with an audio signal of 3.1 kHz and then played back on a usual playback apparatus at a temperature of 30° C. and at a relative humidity of 90%. The tape travelled past the playback head at a speed of 4.75 cm/sec. The tape passed the playback head twice per hour. The output signal was recorded on a recorder.

It has been found that the magnetic tape in which the comparison pigment had been processed showed a signal loss which was clearly observable on the recorder after thirty passages of the tape past the playback head. The magnetic tape in which the pigment manufactured according to the invention had been used did not show any signal loss after a hundred passages of the tape past the playback head.

EXAMPLE 2

Ammonia gas was dissolved in 2 l of an aqueous dispersion containing 400 g of a pigment of $\gamma$-$Fe_2O_3$ particles manufactured according to the Gamras process and having a pH value of 3.0, while stirring, until a pH value of 8 was reached. 6 g of ammonium acetate were added to the dispersion which was then stirred for another hour, the pigment flocculating substantially immediately. The pigment could be filtered through a 10 $\mu$m filter without loss of material and was then washed two times with three liters of water at 20° C. The washing water contained 1 g of ammonium acetate per liter. The pigment was removed from the filter and dried in air at 130° C.

For comparison, a pigment was manufactured by filtering 2 l of the above-mentioned acid dispersion through a 10 $\mu$m filter. The filtration ran off very cumbersomely due to the colloidal character of the dispersion and resulted in a significant loss of material. The pigment was washed two times with 3 l of deionized water of 90° C. and dried in air at a temperature of 130° C.

Both the pigment manufactured according to the invention and the comparison pigment were processed to a magnetic tape and the tape was then tested in the manner described in Example 1. It has been found that the magnetic tape manufactured with the comparison pigment showed such a signal deterioration after 10 passages of the tape past the playback head that the signal could no longer be recorded on the recorder. The magnetic tape containing the pigment manufactured according to the invention did not show any observable signal loss after 100 passages of the tape past the playback head.

What is claimed is:

1. A method of processing $\gamma$-$Fe_2O_3$ particles for use in a magnetic recording element comprising the steps of:

preparing $\gamma$-$Fe_2O_3$ particles in an aqueous dispersion;
separating the $\gamma$-$Fe_2O_3$ from the aqueous dispersion;
washing the separated $\gamma$-$Fe_2O_3$ particles with water; and
drying the washed $\gamma$-$Fe_2O_3$;
characterized in that prior to separating the $\gamma$-$Fe_2O_3$ from the aqueous dispersion, a water-soluble ammonium salt which is derived from a weakly acidic organic acid is added to the aqueous dispersion, said ammonium salt being chosen so that it volatilizes, or decomposes and then volatilizes during the drying step.

2. A method as claimed in claim 1, characterized in that prior to separating the $\gamma$-$Fe_2O_3$ from the aqueous dispersion, a water-soluble base is also added to the aqueous dispersion.

3. A method as claimed in claim 1 or 2, characterized in that prior to the step of washing, a water soluble ammonium salt is added to wash water, said ammonium salt being chosen so that it volatilizes, or decomposes and then volatilizes, during the drying step.

4. A method as claimed in claim 3, characterized in that 1–2 grams of each ammonium salt are added to the aqueous dispersion and to the wash water, respectively, per 100 grams of $\gamma$-Fe$_2$O$_3$.

5. A method as claimed in claim 4, characterized in that the ammonium salt comprises one or more salts from the group of ammonium acetate, ammonium oxalate, and ammonium carbonate.

6. A method as claimed in claim 5, characterized in that the $\gamma$-Fe$_2$O$_3$ is doped with metals.

7. A method as claimed in claim 4, characterized in that the organic acid has a molecular weight not greater than 150.

8. A method as claimed in claim 7, characterized in that the 65-Fe$_2$O$_3$ is doped with metals.

9. A magnetic recording element comprising a carrier and a magnetic coating on the carrier, said magnetic coating comprising a binder, a dispersion agent, and $\gamma$-Fe$_2$O$_3$ particles finally divided in the binder and dispersion agent, said $\gamma$-Fe$_2$O$_3$ particles being processed by the steps of:

preparing $\gamma$-Fe$_2$O$_3$ particles in an aqueous dispersion;
separating the $\gamma$-Fe$_2$O$_3$ from the aqueous dispersion;
washing the separated $\gamma$-Fe$_2$O$_3$ particles with water; and
drying the washed $\gamma$-Fe$_2$O$_3$;
characterized in that prior to separating the $\gamma$-Fe$_2$O$_3$ from the aqueous dispersion, a water-soluble ammonium salt which is derived from a weakly acidic organic acid is added to the aqueous dispersion, said ammonium salt being chosen so that it volatilizes, or decomposes and then volatilizes, during the drying step, such that no or substantial no salts are bonded electrostatically to the surfaces of the $\gamma$-Fe$_2$O$_3$ particles.

10. A magnetic recording element as claimed in claim 9, characterized in that the ammonium salt comprises one or more from the group of ammonium acetate, ammonium oxalate, and ammonium carbonate.

11. A magnetic recording element as claimed in claim 10, characterized in that the $\gamma$-Fe$_2$O$_3$ is doped with metals.

* * * * *

UNITED STATES PATENT AND TRADEMARK OFFICE
CERTIFICATE OF CORRECTION

PATENT NO. : 4,425,409
DATED : January 10, 1984
INVENTOR(S) : HENDRIKUS F. HUISMAN et al It is certified that error appears in the above-identified patent and that said Letters Patent is hereby corrected as shown below:

In the claims:

Claim 8, line 2

Change "65" to --$\gamma$--.

Signed and Sealed this

Third Day of July 1984

[SEAL]

Attest:

Attesting Officer

GERALD J. MOSSINGHOFF

Commissioner of Patents and Trademarks